United States Patent [19]

Birjukov

[11] Patent Number: 5,413,746
[45] Date of Patent: May 9, 1995

[54] METHOD FOR MOLDING SHAPED PRODUCTS AND AN APPARATUS FOR CARRYING OUT SAME

[76] Inventor: Mikhail V. Birjukov, Balabanovo, ulitsa I Maya, 4, kv. 13, Russian Federation, Kaluzhskaya oblast,

[21] Appl. No.: 940,004

[22] Filed: Sep. 3, 1992

[30] Foreign Application Priority Data

Jun. 10, 1992 [RU]  Russian Federation ............ 5041121

[51] Int. Cl.⁶ ............................................ B29C 47/00
[52] U.S. Cl. .................................... 264/118; 264/109; 264/120; 425/325; 425/381
[58] Field of Search .................. 264/109, 120, 118; 425/325, 381, 376.1

[56] References Cited

U.S. PATENT DOCUMENTS

| | | | |
|---|---|---|---|
| 3,245,867 | 4/1966 | Clarke | 264/108 |
| 3,874,207 | 4/1975 | Lemelson | 72/56 |
| 4,060,580 | 11/1977 | Pampel | 264/109 |
| 4,339,405 | 7/1982 | Paszner | 264/108 |
| 4,358,418 | 11/1982 | Heggenstaller | 264/108 |
| 4,645,631 | 2/1987 | Heggenstaller et al. | 264/69 |
| 4,935,182 | 6/1990 | Ehner et al. | 264/112 |
| 5,017,319 | 5/1991 | Shen | 264/124 |

FOREIGN PATENT DOCUMENTS

2932406  2/1981  Germany .

Primary Examiner—Mary Lynn Theisen
Attorney, Agent, or Firm—Ladas & Parry

[57] ABSTRACT

A method for molding shaped products from particles of vegetable origin which have a size of 0.002 to 10 mm at a moisture content of 4 to 15%. The method includes the steps of mixing a filler containing particles of vegetable origin and a binder which is obtained from hemicelluloses released from particles of vegetable origin upon molding. The briquettes are formed from the resultant mixture with an axial passageway then packed and transferred to a molding zone where a continuous shaped blank is obtained by joining each successive packed briquette to the preceding one under a specific pressure of 2 to 50 MPa and a temperature in the range of 160° to 350° C. A counterpressure equal to at least the molding pressure is generated as each successive packed briquette is joined at the molded end of the continuous molded blank. Then products of required length are cut from the resultant continuous shaped blank. An apparatus for carrying out the method includes a chamber (4) for molding the briquettes. The chamber includes two multi-faceted truncated pyramids (15, 16) joined together along the perimeter of their minor bases, the side facets of which are rigidly secured to the frame so that the geometric axes of the pyramids (15, 16) coincide with the molding axis (X—X) of the continuous blank.

26 Claims, 6 Drawing Sheets

METHOD FOR MOLDING SHAPED PRODUCTS AND AN APPARATUS FOR CARRYING OUT SAME

FIELD OF THE INVENTION

The present invention relates to a method for processing feedstock of vegetable origin, and in particular to a method for molding shaped products and an apparatus for carrying out same.

The invention can be used for manufacturing chip boards and bars from the wastes of the pulp and paper and woodworking industries, from vegetable feedstock, and for processing domestic wastes which are sorted according to fractions in advance.

BACKGROUND OF THE INVENTION

Processing wastes obtained from the woodworking and pulp and paper industries is a priority problem in the recycle feedstock processing industry. Production of wood chipboards and squared bars from sawdust and tree bark helps prevent excessive tree felling and thus improve the plant's ecological situation. Furthermore, the processing of domestic wastes accumulating around cities has a favorable effect on air purity and sanitary conditions of the environment.

However, the existing industrial methods for processing wastes of the woodworking industry use polymeric resins which are toxic to humans and animals as binding agents. The problem is, therefore, that of dispensing with toxic binding agents in the manufacture of chipboards and bars.

Equipment used for carrying out the existing molding methods has, as a general rule, a very complicated design because of the need to apply great molding pressures.

Known in the art is a method for extruding plastic materials to produce elongate articles (see for example, U.S. Pat. No. 3,874,207, 1975). In the prior art method, the material is forced through a die by applying one or more kinds of energy, for example, heat energy, ultrasonic oscillation energy, and electromagnetic energy.

The apparatus used to carry out the above method for extruding plastic materials comprises an extrusion chamber which encloses a piston for propelling the extrudable material which is formed into a product and a die. The apparatus further comprises means for imparting oscillatory movement to the piston, which means are activated when a required amount of plastic material is accumulated between the piston and the die in the extrusion chamber. As the means are activated the piston performs a series of oscillations and pushes the material through the die to shape it into an elongated product. Following this, the outlet is closed, and a new batch of material starts to be accumulated in the extrusion chamber.

Said means for imparting oscillatory movement to the piston can alternatively be an induction coil that generates a variable electromagnetic field cooperating with the piston, or another device for example, the means comprises a nozzle to supply hot gas into the chamber at the back of the piston, and an ignition plug. A certain amount of gas is accumulated in the chamber at the back of the piston and is ignited by a spark. The pressure of the expanding gases forces the piston to move toward the die, thereby extruding the plastic material. Under the effect of residual gas pressure, the piston performs several oscillatory moves toward the die.

Said apparatus is used for extruding plastic materials. It can only be used for molding elongate products out of plastic materials when one portion adheres to the other and is held in place by the cohesive forces between the molecules of the plastic material, whereupon the material is polymerized to turn into a continuous and integral product.

The above method is unsuitable for molding mixtures comprising a plastic material as a binder and solid filler particles if the latter have sufficiently large dimensions, in which case no cohesion occurs between the solids at the molecular level. Then, after the molded product has left the extrusion chamber, and before the binder has polymerized, the product is likely to disintegrate, i.e., the bond between the individual portions of the extrudable mixture may be broken.

Apparatuses comprising units to prevent disintegration are used for molding mixtures of this type.

Known in the art is a method for molding shaped products, comprising mixing a filler, containing specially treated particles of vegetable origin, which are disintegrated and sorted according to fractions and of which one fraction is used, and a binder. The resultant mixture is fed to a briquetting zone to form a briquette with an axial passageway, whereupon the briquette is packed and advanced to a molding zone, where a continuous shaped blank is produced by joining each successive packed briquette to a preceeding one under pressure. The blank is then heated, and products of desired length are detached from the continuous shaped blank thus produced (see for example, German Patent No. 2,932,406, 1981).

An apparatus for carrying out the above method comprising as a charging and briquetting chamber, housing a hole-making member, the geometric axis of which is aligned with the molding axis of a blank, and a piston displaceable along the molding axis, the chamber and the piston being mounted on a frame and communicating with each other. The charging and briquetting chamber communicates with a briquette molding chamber which molds the briquettes into a continuous shaped blank, and a heat treatment chamber provided with a heater. The apparatus further comprises means for dividing the blank into products of desired length (see for example, German Patent No. 2,932,406 A1, 1981).

The above apparatus is suitable for molding a mixture comprising vegetable particles and a binder. A synthetic polymeric material is used as the binder. To mold the mixture, the polymeric material is first transferred to a flowable state. For one portion of the molded mass to better engage another, the piston endface is designed so that its middle areas are offset backward relative to the peripheral areas, i.e., a recess is formed. The recess has a waving, rather than a smooth, surface, the wave size descreasing toward the center. To prevent the breakup of the continuous blank, the apparatus has a cooled and a heated portion in the blank passageway. Furthermore, a gap is provided between the two passageway portions to provide heat insulation between them.

To prevent the breakup the passageway is diverging along the path of the blank, the divergence being different for different portions.

The above-mentioned method for manufacturing a continuous shaped blank uses an organic binder which is by itself toxic to humans and animals. The preferred filler is provided by the conifer chips which are easily formed into a mat. To achieve the desired strength of the final product, the above-mentioned patent provides for attaining an intensive matting state of particles of vegetable origin. Tree bark cannot, in practical terms, be used as a filler; if it has to be used, it must be disintegrated minutely. Particles of reduced size, however, require growing amounts of the binder. To reduce the consumption of the binder, this chip size increases, thereby adsversely affecting the strength of the final products.

The mixture is fed into the charging and briquetting chamber by a triple reciprocation of a gate valve. This procedure is required to remove the vapor-gas mixture and toxic gases released from the polymeric binder.

A product manufactured by this method has a density of 0.35 to 0.85 g/cm$^3$. Moreover, the final product is easily flammable and burns well, because it is manufactured on the basis of an organic polymeric binder; also, it swells readily and breaks up under the effect of moisture.

SUMMARY OF THE INVENTION

It is an object of the present invention to develop a method for molding shaped products from a mixture comprising particles of vegetable origin and a binder, which is a non-toxic mineral binder, and conducting the molding process in a special molding chamber that ensures a strong cohesion between individual briquettes and prevents the breakup of the shaped blank during the molding procedure, making it possible to obtain a continuous, integral, nontoxic and hard-to-burn product.

It is also an object of the present invention to develop an apparatus to carry out the above-mentioned method, wherein the molding chamber for continuously molding a shaped blank is designed to provide a strong cohesion between individual briquettes and prevent the breakup of the continuous shaped blank molded from the nontoxic mineral binder and particles of vegetable origin, and to obtain a continuous, strong, nontoxic and hard-to-burn product.

These objects are attained by a method for molding shaped products, comprising mixing a filler containing particles of vegetable origin, which are disintegrated and sorted according to fractions, one fraction of which is used, and a binder. The resultant mixture is fed into a briquetting zone where a briquette with an axial passageway is formed, whereupon the briquette is packed and transferred to a molding zone where a continuous shaped blank is obtained by joining each successive packed briquette to the preceeding one under pressure, and the blank is then heated and products of desired length are separated from the continuous shaped blank. In accordance with the invention the particles of vegetable origin in the fraction used have a size of 0.002 to 10 mm and a moisture content of 4 to 15%. The binder consists of the hemicelluloses released from particles of vegetable origin under molding pressure. The mixture is packed in the briquetting zone at a volume ratio of 4:1 to 7:1, and the temperature is maintained within 160° to 350° C., each successive packed briquette is joined to the preceding one in the molding zone under a specific pressure of 2 to 50 MPa and a temperature in the range of 160° to 350° C., a counterpressure equal to at least the molding pressure being generated as each successive packed briquette is joined at the molded end of the continuous molded blank, whereupon the continuous blank is heat treated.

It is preferred that the binder is further selected from the group consisting of magnesium oxide, calcium oxide, aluminum oxide, iron oxide or their hydrates in an amount of 30 to 50% of the filler weight.

It is advantageous that the binder further comprise roasted magnesium-containing ores having 20 to 98% of magnesium oxide at a temperature of 20° to 350° C. in an amount of 30 to 36% of the filler weight.

It is preferred that, apart from the filler and binder, use be made of a mixing agent, such as an aqueous solution of a salt selected from the group consisting of magnesium chloride and potassium chloride, with a density of 1.1 to 1.6 g/cm$^3$.

It is advantageous that, prior to mixing with the binder, the filler particles should be treated with an antiseptic agent in an amount of 12 to 16% of the filler weight.

Preferably, the antiseptic agent should be a substance selected from the group consisting of magnesium chloride, potassium chloride, sulfuric acid, magnesium sulfate and calcium sulfate.

It is advantageous that, prior to mixing with the binder, the filler particles be treated with a fire retardant in an amount of 30 to 50% of the filler weight.

It is also advantageous to use a fire retardant selected from the group consisting of magnesium oxide and calcium oxide.

It is preferred that the mixture be prepacked in the briquetting zone to build up stresses in a direction normal to the blank molding axis and parallel to the base to obtain the cross-sectional size of the blank following prepacking.

It is preferable, during the briquetting procedure, to provide the briquette facet serving as the base with a ridge the axis of which is parallel to the molding axis, and to form on the opposite face of the briquette a slot replicating the shape of the ridge, the axis of the slot being parallel to the molding axis.

It is preferred that scrap obtained from the production of arabinogalactan and gums be used as the filler.

It is advantageous that tan waste resulting from tanning extract production be used as the filler.

Preferably, arabinogalactan is to be used as the binder in an amount of 5 to 37% of the filler weight.

It is useful that tar-impregnated wood be used as the binder in an amount of 5 to 100% of the filler weight.

The above objects are also attained by an apparatus for performing the method for molding shaped products, comprising a charging and briquetting chamber, housing a hole-making member, the geometric axis of which is aligned with the molding axis of a blank, and a piston displaceable along the molding axis, a briquetting chamber for molding briquettes into a continuous shaped blank, and a heat treatment chamber provided with a heater, said units being mounted consecutively on a frame and communicating with one another, and also having means for dividing the continuous blank into products. According to the invention, the briquetting chamber has the shape of two multi-faceted truncated pyramids interconnected along the perimeter of the minor bases, the side faces of the pyramids being rigidly secured to the frame so that the geometric axis of the pyramids coincides with the molding axis of the continuous blank, the major base of one of the pyramids being joined along the perimeter thereof with the charging and briquetting chamber, and the major base of the other pyramid being connected along the perimeter thereof to the heat treatment chamber, the hole-making member having the shape of a truncated cone, the length of which is equal to at least three times the length of the piston stroke, and being cantilevered to the endface of the piston. The apparatus further having mixture heating means received in the charging and briquetting chamber, a cooling chamber secured to the frame and communicating with the heat treatment chamber, and means for applying a counterpressure to the continuous shaped blank, said means being located in the cooling chamber and intended to press the cooling chamber walls against the continuous blank, as the continuous blank is molded, with a pressure equal to at least the briquette molding force.

It is advantageous that the means for applying counterpressure to the continuous molded blank contain two plates located on the respective parallel molding axis of the side walls of the cooling chamber for movement relative to said walls and coupled kinematically to a power drive.

It is preferred that the taper angle of the hole-forming member lie within the range of 1 to 5 degrees, and the taper angle of the truncated pyramid connected to the charging and briquetting chamber be 10 to 12 degrees greater than the taper of the hole-forming member.

Advantageously, the means to heat the mixture in the charging and briquetting chamber should contain two electrodes connected to a power supply, one of the electrodes being located in the passageway provided in the hole-forming member and electrically coupled to said member, an insulating spacer being provided between the hole-forming member and the piston, and the other electrode being coupled electrically to the housing of the briquetting chamber.

Preferably, the apparatus should contain an insert to shape a ridge, located in the charging and briquetting chamber on the base thereof, and an insert to produce a slot replicating the shape of the ridge, on the chamber wall opposite to the base, the axes of the ridge and slot being parallel to the molding axis.

It is advantageous that the apparatus contain means to prevent the wear of the inside surface of chamber walls, located in the charging and briquetting chamber, the heat treatment chamber and the cooling chamber.

It is preferred that the means to prevent the wear of the side walls of the chambers contain plates of a wear-resistant material, which are mounted on the chamber walls.

It is advantageous that the apparatus contain mixture packing means located in the charging and briquetting chamber.

Preferably, the mixture packing means contains two piston coupled kinematically to a power drive, the ends of the pistons serving as the side walls of the charging and briquetting chamber and the axes of which are perpendicular to the molding axis of the continuous shaped blank.

DESCRIPTION OF THE DRAWINGS

The invention is described below with reference to a particular embodiment thereof and to the accompanying drawings, wherein.

DETAILED DESCRIPTION OF THE PREFERRED EMBODIMENTS

The present method for molding shaped products, for example, squared bars, is carried out as follows:

First, a filler and a binder are prepared.

The filler is prepared from particles of vegetable origin, for example, wood sawdust, shavings and chips, wastes of the pulp and paper industry, such as paper dust and cuttings, tree bark, crushed twigs and branches, cotton plant stalks, rice husks, and seaweed. The particles of vegetable origin used in the present method have a moisture content of 4 to 15%. If the moisture content of particles of vegetable origin is higher than this range, they are dried with hot air to remove excess moisture. The filler is comminuted and sorted according to fractions. The fraction used in the method has a size preferably within 0.02 to 10 mm. The smaller the size of particles of vegetable origin the better they are impregnated with the binder or mixing agent.

The binder is obtained from the hemicelluloses of particles of vegetable origin which are released under molding pressure, hemicelluloses being substances binding cellulose and lignin.

The binder and filler are then blended to obtain a mixture which is supplied to the briquetting zone, briquettes having an axial passageway being obtained from the mixture. After briquetting, the mixture is packed at a volume ratio of 4:1 to 7:1, preferably 6:1. Packing helps remove air pockets and minimize the size of pores between the particles. The temperature in the briquetting zone is maintained within the range of 160° to 350° C., at which the particles of vegetable origin are plasticized.

Following this procedure, the mixture is directed into the molding zone, where a first briquette is molded. A continuous shaped blank is molded in the molding zone by joining each successive packed briquette to the preceding one under a specific pressure of 2.4 to 50 MPa and a temperature lying within the range of 160° to 350° C.

As each successive packed briquette is joined at the side of the molded end of the continuous shaped blank under pressure, a counterpressure of a force equal to, or greater than, the molding force is created, and the vapor-gas mixture is removed.

Next, the continuous shaped blank is heated to 300° C. to carry out the hemicellulose polymerization process, whereupon it is advanced to the cooling zone where the temperature of the continuous shaped blank is reduced gradually to the ambient temperature.

Products of desired length are detached from the continuous shaped blank.

In an alternative embodiment, the binder is further selected from among substances in the group consisting of magnesium oxide, calcium oxide, aluminum oxide, iron oxide or their hydrates, in an amount of 30 to 50% of the filler weight.

The binder is obtained from magnesium-containing ores having a magnesium oxide content in the range of 20 to 80%, for example, Sorel's cement, which is a magnesite powder at a temperature of 20° to 350° C. This is advantageous if a Sorel's cement producing facility is situated close to the site where the present method is practised.

In some instances, depending on the binder composition, the filler and binder are supplemented with a mixing agent, which is an aqueous solution of magnesium chloride or potassium chloride at a density of 1.18 to 1.6 g/cm$^3$.

All the substances listed as binder and mixing agent are not toxic to humans, so the products obtained by the present method are not toxic either.

To impart improved biological stability to the molded product, i.e., to prevent rotting and damage by insects, the filler is treated, prior to mixing with the binder, with an antiseptic agent in an amount of 12 to 16% of the weight of the filler. The antiseptic is selected from the group consisting of magnesium chloride, potassium chloride, sulfuric acid, magnesium sulfate and calcium sulfate.

As the binder is mixed with the filler, the binder is hydrated, as a result of which large amounts of heat are liberated. A thermal field, which reduces sharply the setting time of the mixture, is formed around each filler particle.

In the method for manufacturing products form a filler and binder, the binder is obtained from hemicelluloses released from the cells of particles of vegetable origin during the molding. Simultaneously, the natural moisture contained in the cells and between cells is removed. Also, the hemicellulose is polymerized to envelop the particles and produce an integral blank. The products obtained in this case, however, are easily flammable and rottable.

When products are manufactured with, for example, magnesium oxide used as the binder, the magnesium atoms are distributed over the outer surface of cells. Magnesium oxide cannot penetrate into the cell interior through the membrane. When an integral blank is obtained, the following phenomena occur: first, polymerization of the hemicellulose and, second, formation of a crystalline lattice of magnesium atoms surrounding the cells.

Depending on the desired physical characteristics of the final products, i.e., whether the materials are used for structural or facing purposes, a mixing agent is added to the mixture at the preparation stage. Magnesium chloride, for example, is used as the mixing agent. Magnesium chloride is capable of penetrating through the membrane into the interior of cells of vegetable particles.

As an integral product is molded, first, the hemicellulose is polymerized and, second, a crystalline lattice of magnesium atoms is formed. Magnesium atoms located inside and around the cells are involved in the formation of the lattice. As a result, products obtained with the addition of magnesium chloride have a very high strength. Magnesium chloride is also used as a fire retardant. Therefore, products to which this fire retardant is added make poor burners. Crystallization is completed essentially within 72 hours. The physico-chemical properties of finished products are stabilized within a month's time.

To improve the fire resistance of final products, the filler is treated, prior to mixing with the filler, with a fire retardant in an amount of 30 to 50% of the filler weight. The fire retardant is either magnesium oxide or calcium oxide, which are non-toxic for humans. In the briquetting zone, the mixture portion is packed to remove air and vapor therefrom. Packing is effected by applying a force in a direction perpendicular to the molding axis of the continuous shaped blank, parallel to the base thereof. Packing is continued until the cross-sectional size of the blank is reached. As a briquette is formed, its face serving as the base is provided with a ridge whose axis is parallel to the molding axis, while the opposite face is provided with a slot replicating the shape of the ridge. This makes it possible to form a denser ridge, because the finer fractions settle down to form a denser layer. The filler is provided by scrap resulting from the production of arabinogalactan and gums. It can be used independently or in a mixture with sawdust. The filler can also be provided by tan wastes resulting from the production of tanning extracts, both independently and in a mixture with sawdust. Alternatively, arabinogalactan is used as the binder. Depending on the kind of the product to be obtained, the amount of arabinogalactan varies from 5 to 37% of the filler weight. In the production of bars, the amount of arabinogalactan varies within the range of 5 to 37%, depending on the kind of filler used. During chipboard production, arabinogalactan is used in an amount of 5 to 15% of the filler weight. Alternatively, tar-impregnated wood can be used as the binder in preparing a mixture in amounts of 5 to 100% of the filler weight. The tar-impregnated wood is a crushed stump and ajoining areas of pine-tree roots. Products obtained with the use of tar-impregnated wood have a very high bending strength and can withstand stresses of up to 60 MPa.

An apparatus for molding shaped products comprises a charging and briquetting chamber 1 (FIG. 1) which is provided with a charging bin 2. The chamber 1 is joined along the perimeter of the outlet opening thereof to a chamber 4 that molds briquettes into a continuous shaped blank. The chamber 1 accommodates an axially displaceable piston 6 which is connected, via a reducing gear, to a hydraulic drive (not shown in FIG. 1).

Figure 1:
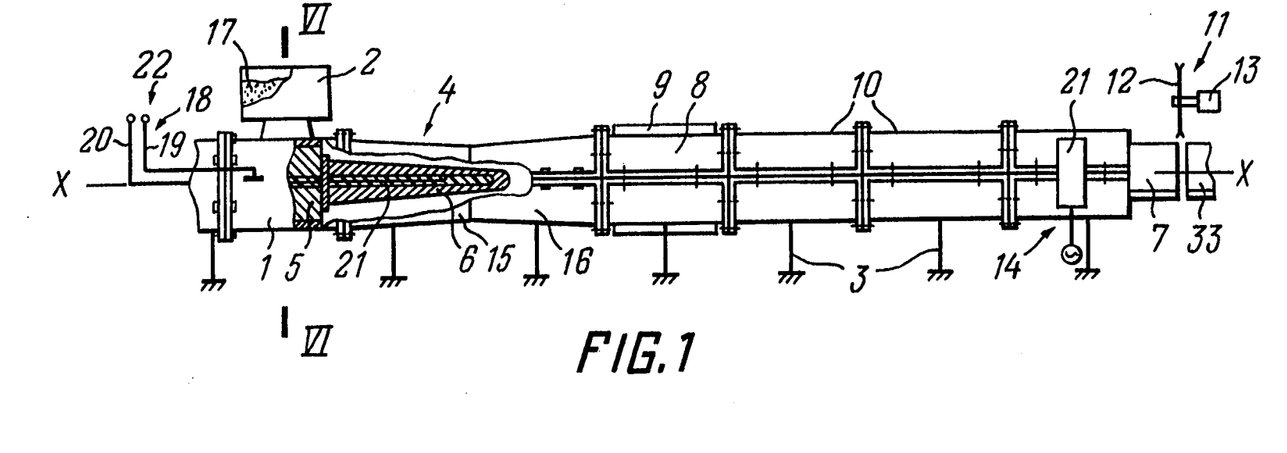
FIG. 1 is a partially exploded view of an apparatus for molding shaped products, according to the invention.

The endface of the piston 5 carries a cantilevered member 6 to form an opening having an axis coinciding with the molding axis X—X of a continuous shaped blank 7. The member 6 is a truncated cone, the length of which is equal to at least three times the length of the stroke of the piston 5. The taper of the member 6 lies within the range of 1 to 5 angular degrees.

A heat treatment chamber 8 is joined along the perimeter to the outlet of the molding chamber 4. The chambers 4 and 8 are mounted on the frame 3. The heat treatment chamber 8 is provided with a heater 9 which is, in the embodiment described herein, an electric heater mounted on the outside surface of the chamber 8. The outlet of the chamber 8 is connected along the perimeter thereof to a cooling chamber 10, which is also mounted on the frame 3. The chamber 10 contains a series of sections, so the continuous shaped blank 7 cools down as it passes through them.

The apparatus is provided with means 11 for dividing the blank 7 into products of desired length. In the embodiment described herein, the means 11 comprises a saw 12 with a power drive 13.

One of the sections of the cooling chamber 10 is provided with means 14 to apply a counterpressure to the continuous shaped blank 7. The means 14 is intended to urge the side walls of the cooling chamber against the blank 7 during briquette molding with a force equal to, or larger than, the briquette molding pressure.

In the embodiment described herein, the briquetting chamber 4 comprises two multi-faceted truncated pyramids 15 and 16 joined together along the perimeter of the minor bases thereof. The side facets of the pyramids 15 and 16 are rigidly secured to the frame 3 so that the geometric axis of the pyramids 15 and 16 is aligned with the molding axis X—X of the continuous blank 7. The major base of the pyramid 15 is joined along the perimeter thereof to the charging and briquetting chamber 1. The major base of the other pyramid 16 is joined along the perimeter thereof to the heat treatment chamber 8. This design of the molding chamber 4 makes it possible to prevent the breakdown of the continuous blank 7 when the piston 5 moves back to permit the chamber 1 to receive a successive portion of the mixture. Furthermore, the taper angle of the truncated pyramid 15 is 10 to 12 angular degrees larger than the taper of the hole-forming member 6 and varies from 20 to 25 angular degrees.

Figure 2:
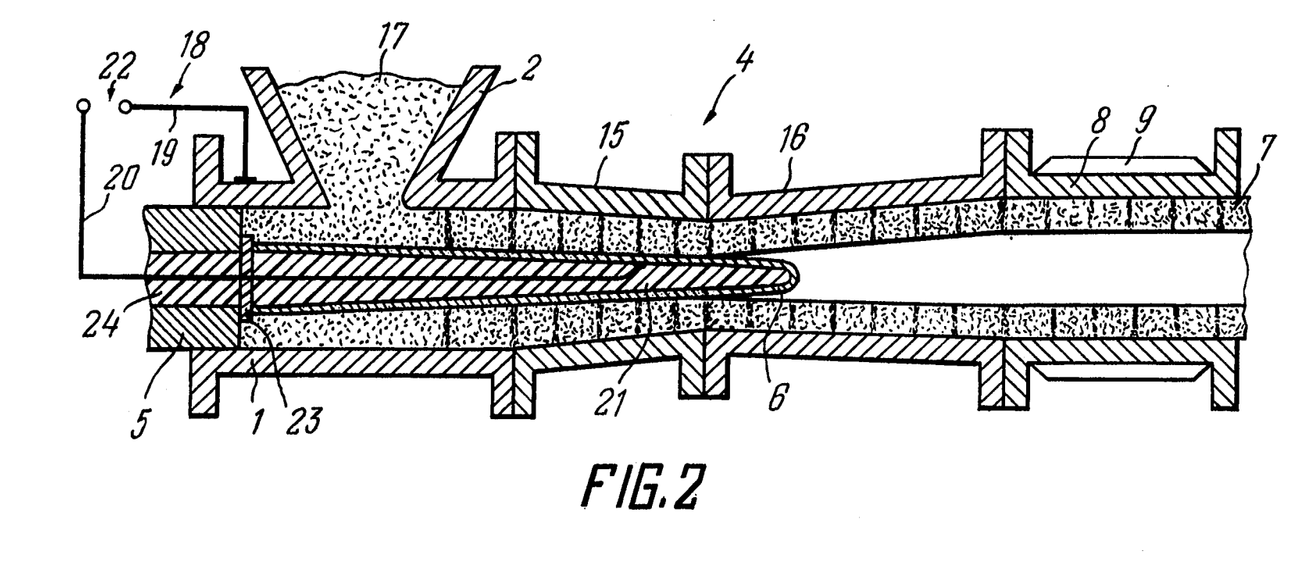
FIG. 2 is a longitudinal sectional view of consecutively connected charging and briquetting chamber, a molding chamber, and a heat treatment chamber with a continuous shaped blank being molded, according to the invention.

The mixture 17 (FIG. 2) entering the charging and briquetting chamber 1 should not be allowed to cool, so that apparatus comprises means 18 for heating the mixture. One electrode, 19, of the means 18 contacts the casing of the chamber 1, and the other electrode, 20, is located in a passageway 21 of the member 6. The electrodes 19 and 20 are connected to a power supply 22. The passageway 21 is reinforced, and the end of the electrode 21 is coupled electrically with the member 6. An insulating spacer is placed between the member 6 and the piston 5, and a part of the electrode 20 extends through the passageway inside the piston 5 and is insulated from the piston 5 by a spacer 24.

Figure 3:
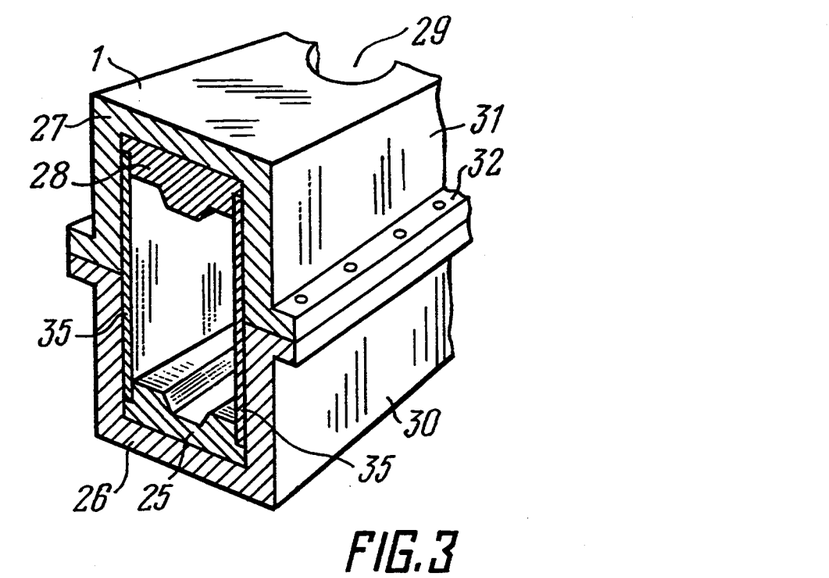
FIG. 3 is a partially exploded view of the charging and briquetting chamber with inserts, according to the invention.

The charging and briquetting chamber 1 (FIG. 3) contains an insert 25 to produce a ridge on the base 26 of the chamber 1. The opposite wall 27 of the chamber 1 is provided with an insert 28 to produce a slot replicating the shape of the ridge. The wall 27 has an opening 29 to allow a mixture to be charged into the chamber 1. The chamber 1 consists of two parts 30 and 31 which are interconnected by a flange 32.

Figure 4:
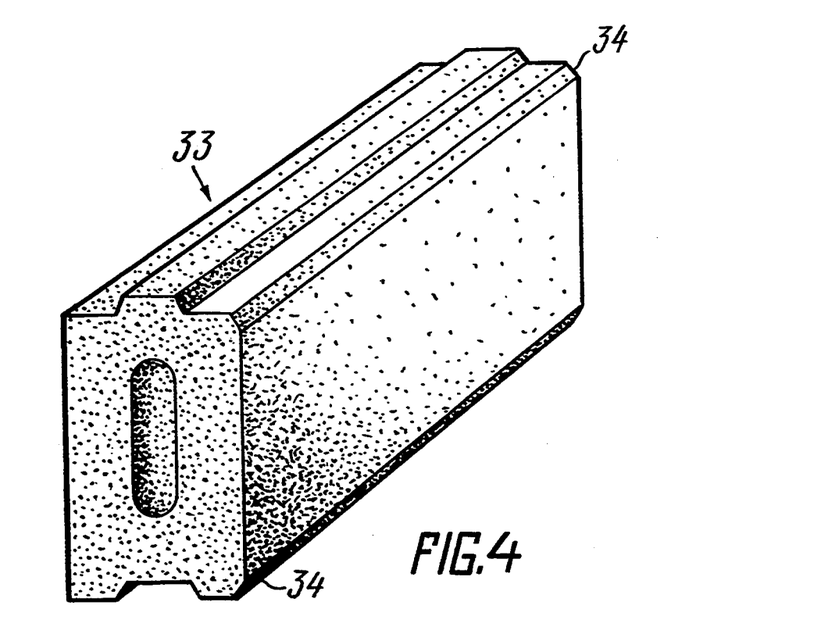
FIG. 4 is a general view of a finished product having a central opening and faces provided on one side of the product, according to the invention.

If needed, a product 33 (FIG. 4) having facets 34 can be obtained. To this end, special inserts (not shown in FIG. 3) are placed in the chamber 1 to produce the facets.

Means are provided to prevent mechanical damage and wear of the inside surface of the chamber walls. The means comprises plates 35 (FIG. 3) of a wear-resistant material which replicate the shape of the inside surfaces of the chamber walls and are provided on the walls of all the chambers 1, 4, 8 and 10.

The means 14 (FIG. 5) to apply counterpressure to the continuous shaped blank comprises two plates 36 and 37 which are located in the last section, on the side walls of the cooling chamber 10. The plates 36 and 37 are pressed against the side walls of the chamber 10 by pressure member 38. At the points of contact with the plates 36 and 37, the pressure member 38 has a spherical surface 39. The end of the pressure member 38 is connected, via a reducing gear 40, to a power drive 41. The pressure members 38 are kinematically interconnected with one another by a shackle 42. When in the chamber 10, the continuous shaped blank moves in guides 43 and 44.

The apparatus also comprises means for prepacking the mixture in the charging and briquetting chamber. In the embodiment described, the means comprises two pistons 45 and 46 (FIGS. 6a and 6b), the endfaces of which serve as the side walls of the charging and briquetting chamber. The axes of the pistons are perpendicular to the molding axis X—X. The piston 45 and 46 are coupled kinematically to hydraulic power drives (not shown in FIG. 6).

Figure 6A:
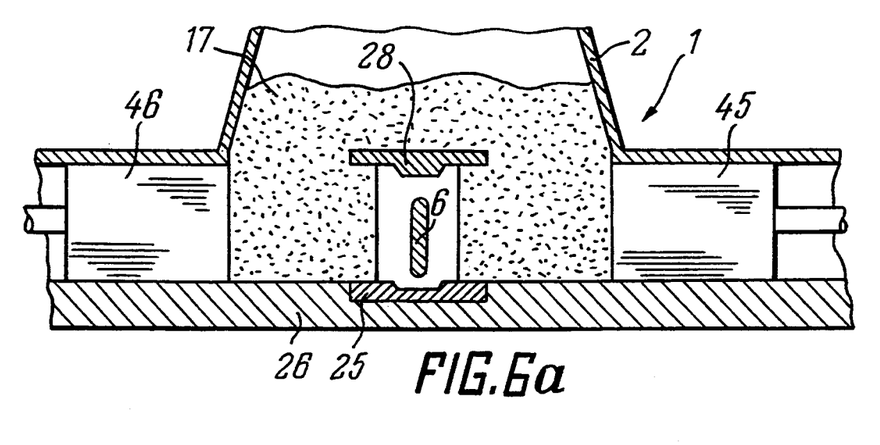
FIG. 6a is a sectional view along the line Y1—Y1 in FIG. 1 of means for prepacking the mixture in the charging and briquetting chamber in a position with the chamber charged with the mixture, according to the invention.
Figure 6B:
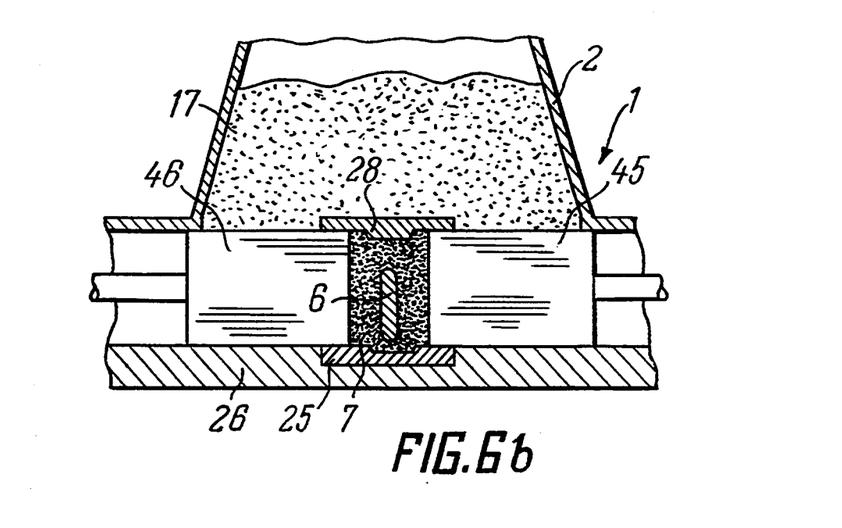
FIG. 6b is a sectional view as in FIG. 6A wherein the means for prepacking is, in a position with the mixture packed to the cross-sectional size of the blank, according to the invention.

FIG. 6a shows the pistions 45 and 46 in a position when the mixture is charged into the chamber 1. FIG. 6b shows the piston 45 and 46 in a position when the mixture has been packed to the cross-sectional size of the shaped blank being molded.

The apparatus for molding shaped products comprises a unit 48 (FIG. 7) for crushing chips 47 and tree bark. It can be used for crushing any particles of vegetable origin. The unit 48 is connected by a pipeline to a screen 49 provided to separate the crushed filler particles into fractions. The screen 49 is connected by a pipeline to dryer 50. The dryer is intended to dry the crushed particles in a fluidized bed. The dried filler particles are collected in an accumulator bin 51.

The binder is prepared from a mineral stock. The apparatus comprises an ore roasting furnace 52 and a conventional type crusher. A ball mill is used in the embodiment described.

Figure 7:
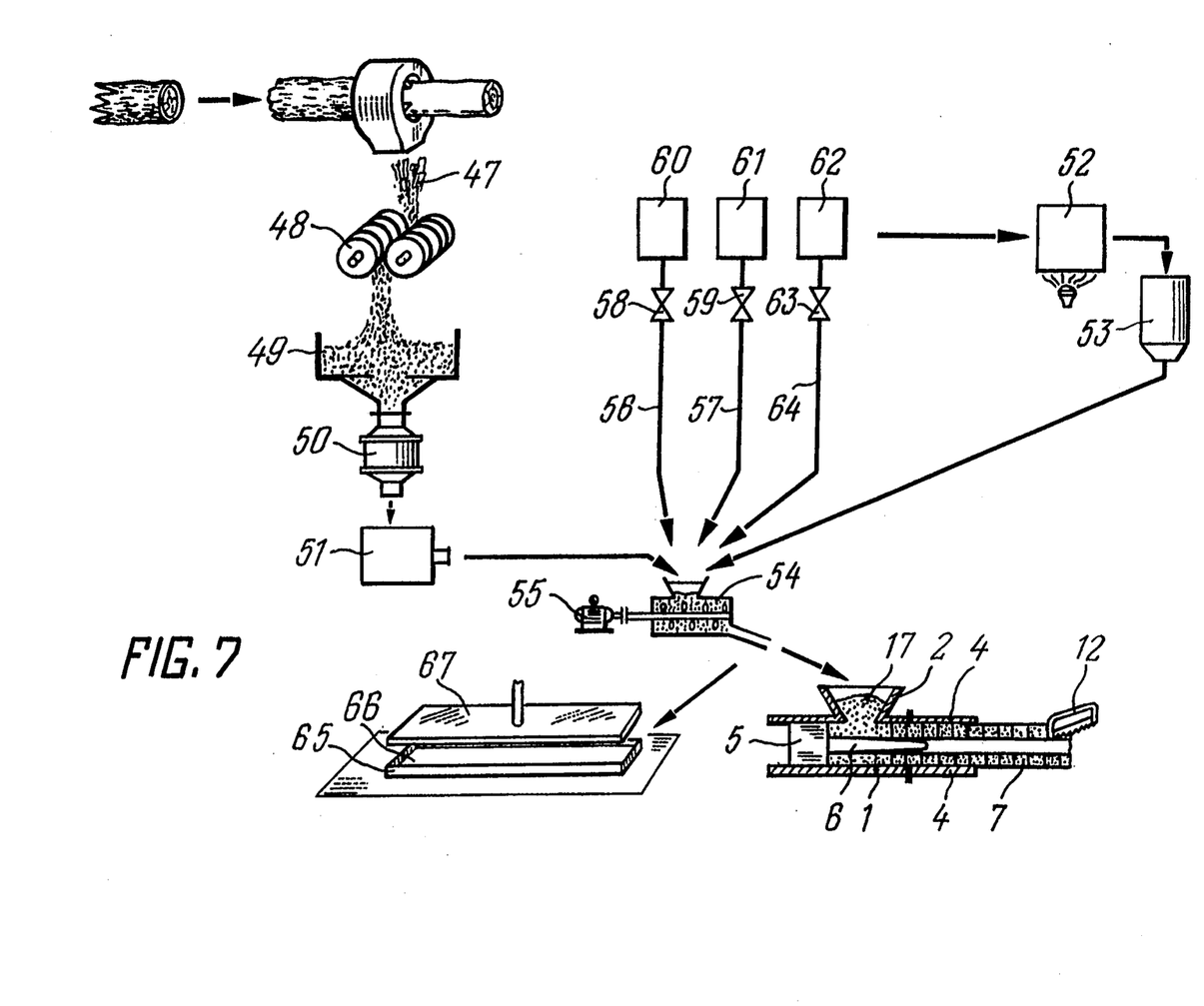
FIG. 7 is a view of the apparatus for molding shaped products, according to the invention.

A screw-type mixer 54, having a screw connected to an electric power drive 55, is provided for mixing the filler and the binder.

The apparatus further comprises tanks 60 and 61 for antiseptic and fire retardant solutions, which are pumped from said tanks via pipelines 56 and 57 and valves 58 and 59, respectively, to the mixer 54. A mixing agent tank 62, connected via a valve 63 and pipeline 64 to the mixer 54, is further provided in the apparatus.

When a board 66 is to be molded, the mixture 17 is emptied from the mixer into a mold 65. Molding is effected by a press 67.

The apparatus is operated as follows:

Wood wastes, for examples, chips 47 (FIG. 7) and wood bark are fed into the crushing unit 48. The crushed filler particles are advanced to the screen 49 where they are screened to separate fractions of a particle size of 0.002 to 10 mm. The moisture content of the particles is monitored continuously to be within 4 to 16%. In this case, the particles are dried with hot air in the fluidized bed dryer 50. The prepared filler is transferred to the accumulator bin 51.

Depending on the desired properties of final products, i.e., density, bending strength and hardness, the binder is chosen alternatively from hemicelluloses of particles of vegetable origin released during the molding process, or an additional mineral binder. When magnesium oxide is used as the binder, the magnesium-containing ore is pre-roasted in the roasting furnace 52.

Upon roasting, the ore lumps are crushed in the crusher 53, which is a ball mill in the embodiment described.

The powdered magnesium oxide flows into the screw-type mixer 54 which is also supplied at a desired ratio from the accumulator bin 51. The filler and binder are blended in the mixer 54 and the resultant mixture 17 is fed to the charging bin 2 of the apparatus for molding a continuous shaped blank. The charging bin is mounted over the charging opening 29 of the charging and briquetting chamber 1.

For the mass to set better, the mixer 54 is supplied with an aqueous solution of magnesium chloride at a density of 1.2 g/cm$^3$ as a mixing agent. The mixing agent is supplied from the tank 62 via the pipeline 64.

To render the molded products resistant to fire and mildew fungi, the filler is treated with an aqueous solution of magnesium chloride at a density of 1.18 g/cm$^3$ as an antispectic agent, and with magnesium oxide in dry powder form as a fire retardant, which solution and power are fed in at a desired ratio from the tanks 60 and 61 into the mixer 54.

As the mixture 17 (FIG. 1) is charged into the charging and briquetting chamber 1 the piston 5 is withdrawn to the far left position, and the pistons 45 (FIG. 6) and 46 are also withdrawn to a position in which the mixture is charged in. The chamber 1 is loaded with the mixture over 10 seconds.

Upon charging, the mixture is packed in a direction perpendicular to the molding axis. For this purpose, the piston 45 and 46 are moved toward the molding axis. Since the endfaces of the pistons 45 and 46 serve as walls of the chamber 1 in a position when they are advanced to the closest possible distance from the molding axis, the mixture in the chamber 1 acquires the cross-sectional size of the blank 7.

A briquette is then formed, as the piston moves toward the molding chamber 4. The briquette is provided with an axial passageway. The mixture is packed at a volume ratio of 4:1 to 7:1, preferably 6:1. Simultaneously, a ridge and a slot are formed in the briquette, the ridge being provided from below. Since the finer particles settle down the ridge has a more solid structure. When the mixture is packed air pockets are removed and the size of pores between the particles is reduced. The temperature of the mixture in the chamber 1 is maintained within 160° to 350° C. by connecting the electrodes 19 and 20 to the power supply 22. The particles of vegetable origin are plasticized at this temperature.

The piston 5 is then retracted to the far left position and a new batch of mixture 17 is admitted into the chamber 1, i.e., the briquetting process is repeated. Meanwhile, at the end of the stroke of the piston 5 the preceding molded briquette is pushed by the piston into the molding chamber 4. The briquette is first admitted into the part of the chamber 4, which is defined by the pyramid 15 and the cross-sectional area of which decreases along the path of the briquette. In this part of the chamber 4, each successive briquette is joined to the preceding briquette under a specific pressure of up to 30 MPa. As a result, a continuous shaped blank 7 is obtained.

Figure 5:
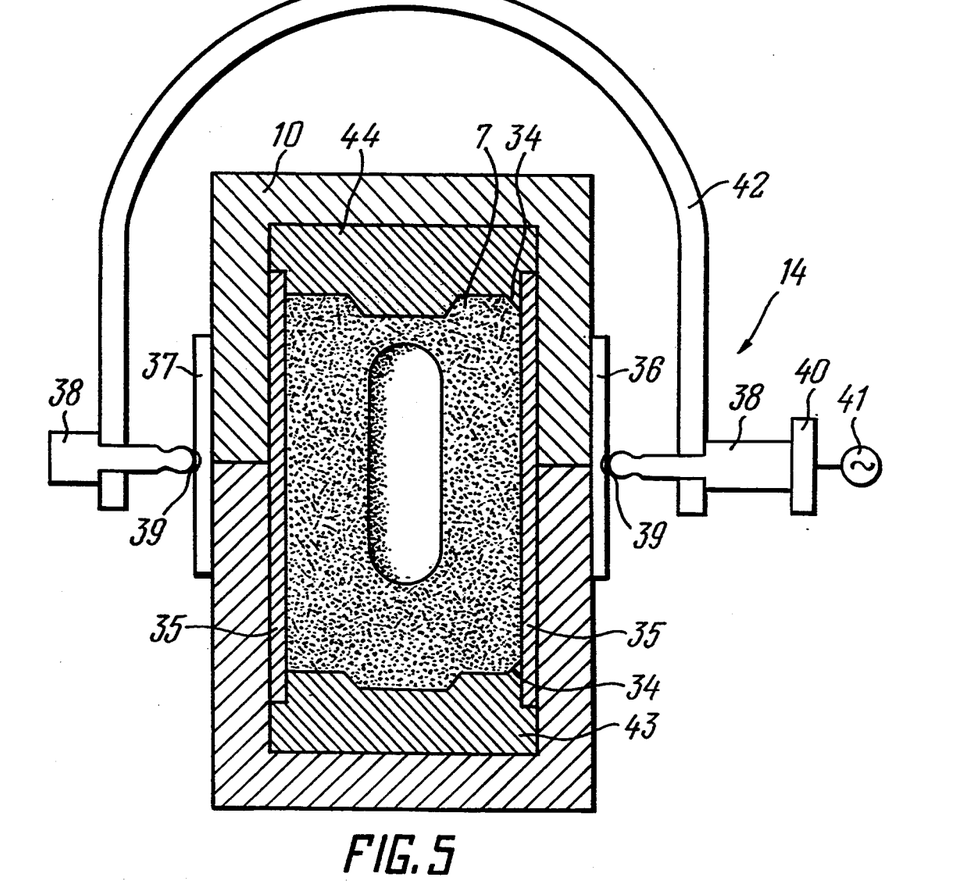
FIG. 5 is a cross-sectional view of means to apply counterpressure to the continuous shaped blank, provided on the cooling chamber, according to the invention.

As each successive briquette is joined to the preceding one, a force equal to, or larger than, the molding pressure is applied to the blank 7 at the molded end thereof, while the plates 36 and 37 are urged against the side walls of the chamber 10.

As the piston 5 is withdrawn to the starting position, no force is applied to maintain the mixture in the molded state, yet the breakup of the mixture is prevented by the tapered surface of the hole-forming member 6 since the length of the member 6 exceeds three times the length of the stroke of the piston 5.

When a sufficient number of compressed briquettes has accumulated in the first part of the molding chamber 4 the blank 7 is pushed into the second part of the chamber 4 defined by the pyramid 16 of increasing cross-section. In this part of the chamber 4, the breakup of the mixture toward the piston 5 is prevented by the widening free passage area of the chamber 4.

Vapors and gases released upon molding are vented through the central opening in the blank 7. These vapors and gases tend to expand the molded mixture. Upon the pressure of the released vapors and gases, the blank 7 slowly increases its size, assuming the desired shape at the outlet of the chamber 4.

The molded blank 7 which has entered the second part of the chamber 4 cannot break up toward the piston because, once through the smallest cross-sectional area of the chamber 4 the cross-sectional area begins to widen, as indicated above, in the absence of a force exceeding the molding force that could return the blank back.

The chamber 4 is where the polymerization of hemicellulose begins and where the blank is transformed into a solid product.

Next, the continuous shaped blank 7 enters the heat treatment chamber 8 where the temperature is maintained within the same range of about 300° C. In this chamber, hemicellulose polymerization occurs, i.e., the mixture sets and the blank 7 is transformed into a solid continuous shaped blank 7.

Then, the continuous shaped blank 7 is fed into the cooling chamber 10 comprising a series of sections. As the blank 7 passes through the sections it is cooled to the ambient temperature.

When out of the cooling chamber 10, the continuous shaped blank 7 is cut up into products 33 which are piled up in stacks. To manufacture chipboards 66, the mass is extruded from the mixer directly into the mold 65 and molded by a press 67.

The present method is suitable for manufacturing molded products, for example, squared bars for making residential houses, chipboards for facing walls and making furniture, etc. Products obtained by the present invention are non-toxic, are not flammable and do not rot. They are produced by waste-free and ecologically clean techniques, i.e., they do not contaminate the environment.

I claim:

1. A method for molding shaped products, comprising the steps of:

mixing a filler with a binder to form a resultant mixture, said filler comprising crushed and sorted particles of vegetable origin, said particles of vegetable origin having a size of 0.002 to 10 mm at a moisture content of 4 to 15% said binder being obtained from hemicellulose released from particles of vegetable origin under pressure;

feeding the resultant mixture to a briquetting zone to form a briquette, said briquetting zone having an axial passageway, said resultant mixture being packed in the briquetting zone at a volume ratio of 4:1 to 7.1, with the temperature of the briquetting zone being maintained within a range of 160° to 350° C. whereby to form the briquette;

molding said briquette with successively packed briquettes in a molding zone to form a continuous shaped blank under a molding pressure of 2 to 50 Mpa and a temperature in the range of 160° to 350° C.;

applying a counterpressure while molding the briquettes, said counterpressure being applied with a force at least equal to the molding pressure, and heat-treating the continuous shaped blank;

cutting products of desired length from the heat-treated continuous shaped blank.

2. A method as claimed in claim 1 wherein said binder further comprises a substance selected from the group consisting of magnesium oxide, calcium oxide, aluminum oxide, iron oxide and hydrates thereof, said binder being present in the mixture in an amount of 30 to 50% of the weight of the filler.

3. A method as claimed in claim 1 wherein said binder further comprises a substance obtained from roasted magnesium-containing ores with a magnesium oxide content of 20 to 98% at a temperature of 20° to 350° C., said binder being present in the mixture in an amount of 30 to 36% of the weight of the filler.

4. A method as claimed in claim 2 wherein a mixture agent is mixed with the filler and binder in the mixing step, said mixing agent comprising an aqueous solution of a salt selected from the group consisting of magnesium chloride and potassium chloride, said mixing agent having a density ranging from 1.18 to 1.6 g/cm$^3$.

5. A method as claimed in claim 1, wherein prior to mixing with the binder, said filler particles are treated with an antiseptic agent in an amount of 12 to 16% by weight based on the weight of the filler.

6. A method as claimed in claim 5 wherein said antiseptic agent, is a substance selected from the group consisting of magnesium chloride, potassium chloride, sulfuric acid, magnesium sulfate and calcium sulfate.

7. A method as claimed in claim 1 wherein prior to mixing with the binder, said filler particles are treated with a fire retardant in an amount of 30 to 50% of the weight of the filler.

8. A method as claimed in claim 7 wherein said fire retardant is a substance selected from the group consisting of magnesium oxide and calcium oxide.

9. A method as claimed in claim 1 wherein said blank has a molding axis, a base and a cross-sectional size, said mixture being prepacked in the briquetting zone by applying forces in a direction perpendicular to the molding axis of the blank and parallel to the base until the cross-sectional size of the blank is attained.

10. A method as claimed in claim 1 wherein said briquette has a base facet, an opposite facet and a molding axis, and wherein said briquette is molded with a ridge in its base facet, said ridge having an axis which is parallel to the molding axis, the opposite facet being provided with a slot replicating the shape of the ridge, and having an axis parallel to the molding axis.

11. A method as claimed in claim 1 wherein said filler is scrap obtained from the production of arabinogalactan and gums.

12. A method as claimed in claim 1 wherein said filler is tan waste obtained from the production of tanning extracts.

13. A method as claimed in claim 11 wherein said binder comprises arabinogalactan in an amount of 5 to 37% of the weight of the filler.

14. A method as claimed in claim 11 wherein said binder comprises tar-impregnated wood in an amount of 5 to 100% of the weight of the filler.

15. An apparatus for molding shaped products, comprising a charging and briquetting chamber containing a hole-forming member and a piston, the charging and briquetting chamber being mounted on a frame in sequence and communication with a molding chamber and a heat treatment chamber, said molding chamber comprising molding means for exerting a force to mold briquettes into a continuous shaped blank having a blank molding axis, said heat treatment chamber being provided with a heater, said apparatus also comprising means for separating the continuous blank into products, said charging and briquetting chamber having a geometric axis which is aligned with the blank molding axis, said piston being displaceable along the molding axis for at least the length of a piston stroke, said chamber for molding the briquettes comprising first and second multi-faceted truncated pyramids each having a side facet, a major base and a minor base, said pyramids being joined together along a perimeter of their minor bases, the side facets of the pyramids being secured to the frame so that the pyramids have geometric axes which coincide with the molding axis of the continuous blank, the major base of the first pyramid being joined along a perimeter thereof to the heat treatment chamber, the hole-forming member being a truncated cone having a length, the length of the truncated cone being at least three times the length of the piston stroke, said truncated cone being cantilevered to an endface of the piston, the apparatus also comprising mixture heating means for heating a mixture in the charging and briquetting chamber, a cooling chamber mounted on the frame in communication with the heat treatment chamber and having side walls which are parallel to the molding axis, and means for applying a counterpressure to the continuous shaped blank with a counterpressure force sufficient to urge the walls of the cooling chamber against the continuous blank as the continuous blank is molded, said counterpressure force being at least equal to the force exerted by said molding means.

16. An apparatus as claimed in claim 15, wherein said means for applying counterpressure to the continuous shaped blank comprises two plates located on respective parallel molding axes of the side walls of the cooling chamber for movement relative to said walls and kinematically coupled to a power drive.

17. An apparatus as claimed in claim 15 where the hole-forming member has a taper which lies within the range of 1 to 5 angular degrees, the truncated pyramid joined to the charging and briquetting chamber having a taper angle which is 0.10 to 12 angular degrees larger than the taper of the hole-forming member.

18. An apparatus as claimed in claim 15 wherein the briquetting chamber has a casing and wherein said mixture heating means in the charging and briquetting chamber comprises two electrodes connected to a power supply, a first of the electrodes being situated in a passageway provided in the hole-forming member and being connected electrically to said member, an insulating spacer being placed between the hole-forming member and the piston, and a second of the electrodes being connected electrically to the casing of the briquetting chamber.

19. An apparatus as claimed in claim 15 wherein the charging and briquetting chamber has a base and a wall opposite the base, the apparatus comprising an insert for producing a ridge located in the charging and briquetting chamber on the base thereof, and an insert for forming a slot replicating the shape of the ridge located in the wall of the chamber opposite to the base.

20. An apparatus as claimed in claim 15 wherein the charging and briquetting chamber, the molding chamber, the heat treating chamber and the coating chamber each comprises chamber walls with inside surfaces, the apparatus comprising first means for preventing wear of the inside surfaces of the chamber walls, said first means being located in the charging and briquetting chamber, in the briquette molding chamber, in the heat treatment chamber, and in the cooling chamber.

21. An apparatus as claimed in claim 20 wherein said means for preventing the wear of the chamber walls comprises plates of a wear-resistant material, which are mounted on the chamber walls.

22. An apparatus as claimed in claim 15 wherein the apparatus further comprises means for packing a mixture in the charging and briquetting chamber.

23. An apparatus as claimed in claim 22 wherein said mixture packing means comprises two packing pistons having endfaces and axes coupled kinematically to a power drive, with the endfaces of the packing pistons serving as side walls of the charging and briquetting chamber and the axes of the packing pistons being perpendicular to the molding axis of the continuous shaped blank.

24. In a method for molding shaped products, wherein the method comprises mixing a filler containing particles of vegetable origin and a binder to form a mixture and then molding the mixture under pressure to form the shaped product, the improvement comprising including in the binder hemicelluloses released from particles of vegetable origin under molding pressure.

25. A method as claimed in claim 24, wherein the binder consists of the hemicelluloses released from the particles of vegetable origin.

26. A method as claimed in claim 24, wherein the binder further comprises a substance selected from the group consisting of magnesium oxide, calcium oxide, aluminum oxide, iron oxide and hydrates thereof.

* * * * *